United States Patent
Clingan

(10) Patent No.: US 11,137,727 B2
(45) Date of Patent: Oct. 5, 2021

(54) VALIDATION DEVICE FOR TESTING A MACHINERY SAFETY SYSTEM

(71) Applicant: Swivel-Link, LLC, Hicksville, OH (US)

(72) Inventor: Jonathan E. Clingan, Auburn, IN (US)

(73) Assignee: Swivel-Link, LLC, Hicksville, OH (US)

( * ) Notice: Subject to any disclaimer, the term of this patent is extended or adjusted under 35 U.S.C. 154(b) by 265 days.

(21) Appl. No.: 16/375,364

(22) Filed: Apr. 4, 2019

(65) Prior Publication Data

US 2020/0319606 A1 Oct. 8, 2020

(51) Int. Cl.
*H01H 47/00* (2006.01)
*G05B 9/03* (2006.01)
*H01H 9/02* (2006.01)

(52) U.S. Cl.
CPC ............. *G05B 9/03* (2013.01); *H01H 47/005* (2013.01); *H01H 9/0214* (2013.01)

(58) Field of Classification Search
CPC ....... G06B 9/03; H01H 47/005; H01H 9/0214
USPC .......................................................... 702/21
See application file for complete search history.

(56) References Cited

U.S. PATENT DOCUMENTS

| | | | |
|---|---|---|---|
| 6,034,612 A | 3/2000 | Heckel et al. | |
| 6,089,453 A * | 7/2000 | Kayser | G06Q 30/06 235/378 |
| 7,395,123 B2 * | 7/2008 | Papenbreer | G05B 19/054 700/21 |
| 8,803,654 B2 | 8/2014 | Kurachi et al. | |
| 9,800,083 B1 * | 10/2017 | Supper | H02J 7/025 |
| 9,829,866 B2 | 11/2017 | Ruth | |
| 2003/0208157 A1 * | 11/2003 | Eidson | A61D 7/00 604/131 |
| 2006/0230298 A1 * | 10/2006 | Bohlinger | H02H 3/006 713/300 |
| 2007/0114836 A1 * | 5/2007 | Kaminski | B60T 13/746 303/7 |
| 2011/0112405 A1 * | 5/2011 | Barthe | A45D 44/005 600/459 |
| 2013/0046436 A1 * | 2/2013 | McGaughey | G01R 31/50 701/33.5 |
| 2017/0211640 A1 * | 7/2017 | Pearce | H02P 29/04 |
| 2018/0286610 A1 | 10/2018 | Saumer et al. | |
| 2020/0076499 A1 * | 3/2020 | Al Sayeed | H04B 10/0791 |
| 2020/0191458 A1 * | 6/2020 | Read | F25B 47/02 |

FOREIGN PATENT DOCUMENTS

EP 2 099 048 B1 5/2010

* cited by examiner

*Primary Examiner* — Ly D Pham
(74) *Attorney, Agent, or Firm* — Taylor IP, P.C.

(57) ABSTRACT

A validation device for a machinery safety system including a housing, an electrical processing circuit, at least one switch connected to the housing, at least one indicator, and a quick-connect interface for connecting in series to the machinery safety system. The electrical processing circuit is configured for inducing at least one fault in the machinery safety system, diagnosing the at least one fault, and indicating by the at least one indicator a status of the machinery safety system.

6 Claims, 4 Drawing Sheets

VALIDATION DEVICE FOR TESTING A MACHINERY SAFETY SYSTEM

BACKGROUND OF THE INVENTION

1. Field of the Invention

The present invention relates to safety systems, and, more particularly, to a device for testing and diagnosing safety systems.

2. Description of the Related Art

Some machinery systems, for example automated plants, may include a safety control system for autonomously controlling one or more machines of the machinery system in a desired manner in adherence to regulation standards. For instance, upon a malfunction of a machine, the safety control system may switch off, i.e., reroute power away from, the malfunctioning machine. A typical safety control system may include a processor, a safety relay unit with various connectors and switches, sensors coupled to the safety relay unit for monitoring the machinery, and accompanying wiring.

Typically, an automated plant is required to meet a particular safety standard, such as the EN ISO 13849, in order to protect against possible damage to the plant or injury to persons working at the plant. Hence, a safety control system must generally be tested to validate that the safety control system meets a particular standard. This validation process may occur upon the assembly or intermittently throughout the operational life of the machinery safety system.

The validation process may be conducted by a disinterested person who manually interacts with the machinery safety system, and the control wiring thereof, to determine whether the machinery safety system adheres to the pertinent safety standards. For example, during the validation process, the disinterested person may remove single wires or connections from the system and induce short circuits into the control wiring, which usually occurs inside of a live electrical panel. Once the validation process is complete, the machinery safety system must be reassembled and tested again to ensure proper reassembly. As can be appreciated, the validation process may be time-consuming and arduous because of the disassembly, the individual testing of a given wire, and the reassembly of the generally complex machinery safety system. Furthermore, the testing of a live electrical panel may lead to an increased risk of injury for the person conducting the validation process.

What is needed in the art is a device and method for efficiently testing a machinery safety system.

SUMMARY OF THE INVENTION

The present invention provides a hand-held, universal safety validation device for efficiently testing the safety standards of a machinery safety system or device. The validation device may include a housing, switches, status indicators such as indicator lights, a quick-connect interface, and accompanying electrical wiring housed within the housing. The validation testing can be conducted as part of an automated assembly station or an end of line test. The safety validation device may be coupled in series with the machinery safety system without the need of the user to disassemble and/or directly interface with the wiring of the machinery safety system. Also, the safety validation device may remain in the circuit of the machinery safety system during the entire diagnostic and fault induction testing and may be removed when all of the testing is completed.

The invention in one form is directed to a validation device for a machinery safety system. The validation device includes a housing, an electrical processing circuit disposed within the housing, at least one switch connected to the housing and operably connected to the electrical processing circuit, at least one indicator connected to the housing and operably connected to the electrical processing circuit, and a quick-connect interface connected to the housing and operably connected to the electrical processing circuit. The quick-connect interface is configured for connecting in series to the machinery safety system. The electrical processing circuit is configured for inducing at least one fault in the machinery safety system, diagnosing the at least one fault, and indicating by the at least one indicator a status of the machinery safety system.

The invention in another form is directed to a method for testing and validating a machinery safety system. The method includes the step of providing a validation device including a housing, an electrical processing circuit disposed within the housing, at least one switch connected to the housing and operably connected to the electrical processing circuit, at least one indicator connected to the housing and operably connected to the electrical processing circuit, and a quick-connect interface connected to the housing and operably connected to the electrical processing circuit. The quick-connect interface is configured for connecting in series to the machinery safety system. The method may also include the steps of connecting the validation device by the quick-connect interface to the machinery safety system, inducing at least one fault, by manipulating the at least one switch, in the machinery safety system, and indicating by the at least one indicator a status of the machinery safety system.

An advantage of the present invention is that the safety validation device allows the user to easily diagnose and induce faults in the machinery safety system and control the functions of the machinery safety system by manipulating the array of switches on the safety validation device itself.

Another advantage is that the safety validation device may directly couple with the machinery safety system without needing to dissemble the system, thereby increasing the efficiency of validating the machinery safety system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
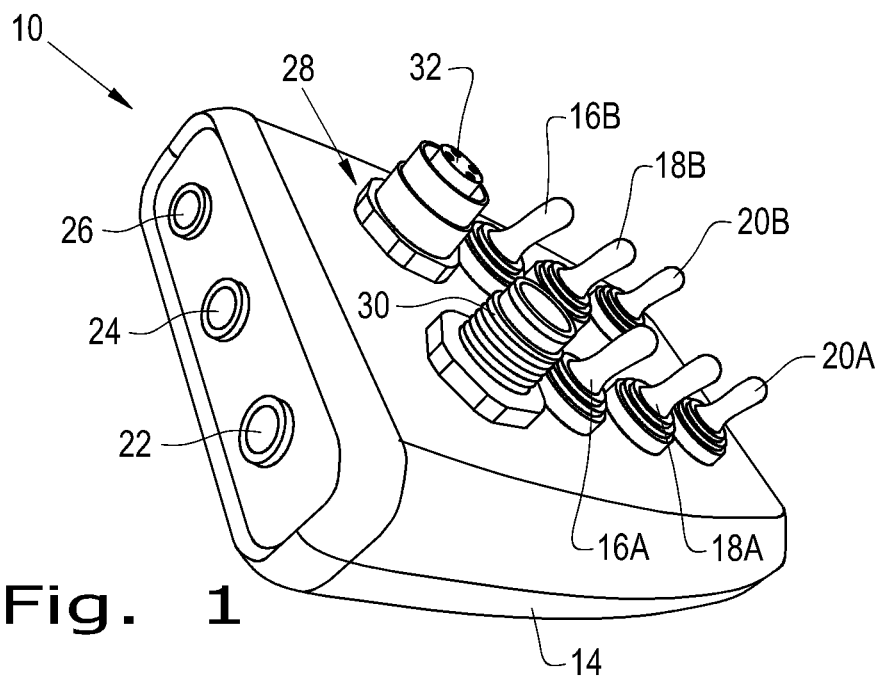
FIG. 1 is a perspective view of a safety validation device.
Figure 2:
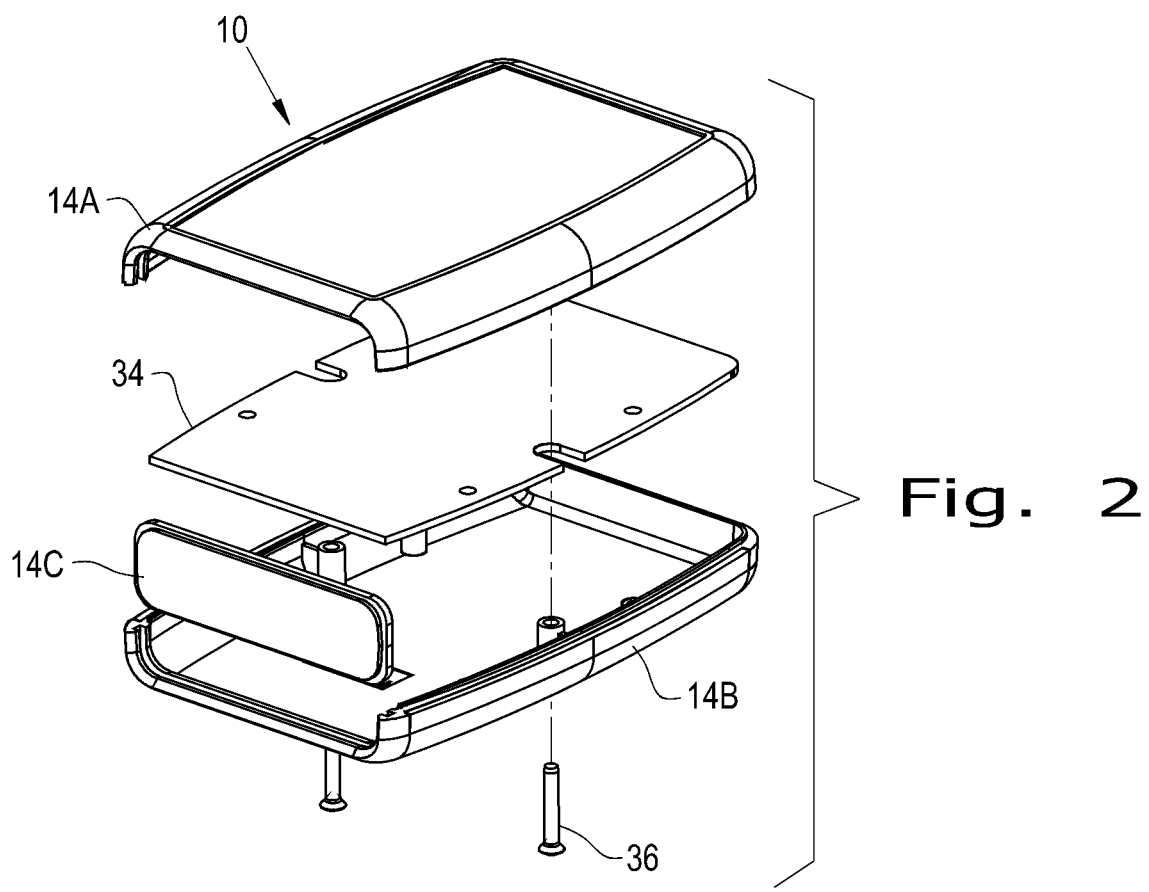
FIG. 2 is an exploded view of the safety validation device.

Referring now to the drawings, and more particularly to FIGS. 1-4, there is shown a validation device 10 for a machinery safety system 12. The safety validation device 10 may include a housing 14, at least one switch 16A, 16B, 18A, 18B, 20A, 20B, at least one indicator 22, 24, 26, and a quick-connect interface 28 with at least two connectors 30, 32. The safety validation device 10 may also include an electrical processing circuit 34 (FIG. 2). The safety validation device 10 may induce at least one fault in the machinery safety system 12, diagnose the faults, and indicate, by the at least one indicator 22, 24, 26 a status of the machinery safety system 12 to the user. The safety validation device 10 may or may not include its own power source. For example, the safety validation device 10 may be a pass-through device which receives power from the machinery safety system 12 through the connectors 30, 32. The safety validation device 10 may also be referred as a PLx unit.

Once the safety validation device 10 is connected to and provided with power by the electrical panel of the machinery safety system 12, or other portion, the user may subsequently induce faults into the machinery safety system 12 during its operation. By manipulating the switch(es) 16A, 16B, 18A, 18B, 20A, 20B, and accordingly observing the status indicator(s) 22, 24, 26, the user may accordingly determine whether the machinery safety system 12 has been properly designed and assembled. The electrical processing circuit 34 of the validation device 10 may be configured for validating at least one of a hardware, a software design, an assembly, and wiring of the machinery safety system 12. The electrical processing circuit 34 of the validation device 10 may also be configured for validating the machinery safety system 12 as required by the ISO 13849-2 safety standard. The safety validation device 10 may be used in any sector, such as the automation industry, the environmental sector, or the health sector. Any personnel may use the safety validation device 10, such as safety professionals, maintenance and plant safety personnel, engineers, technicians, machinery builders and systems integrators, students, or safety specialists.

The machinery safety system or device 12 may be in the form of any desired safety system. The machinery safety system 12 may include an electric control panel, an electronic control unit, a relay unit, one or more sensors, an emergency stop controller, an alarm, and/or accompanying cabling. The status of the machinery safety system 12 may refer to a status of one or more of the electrical channels within the machinery safety system 12. The status may indicate that a break, a short, a cross-short, or a ground short has occurred in one or more channels. It should be appreciated that the safety validation device 10 may be connected to and test any desired system or device.

The housing 14 may be in the form of a uniform housing or a multipart housing. For example, the housing 14 may be a multipart housing 14 which includes a top part 14A, a bottom part 14B, and a side part 14C (FIG. 2). The multipart housing 14 may be snap-fitted, epoxied, and/or fastened together, for example, by one or more fasteners 36. The parts 14A, 14B, 14C of the housing 14 may include through holes (unnumbered) to correspondingly fit the at least one switch 16A, 16B, 18A, 18B, 20A, 20B, the at least one indicator 22, 24, 26, and the quick-connect interface 28. The housing 14 may comprise any suitable material, such as plastic.

Figure 3:
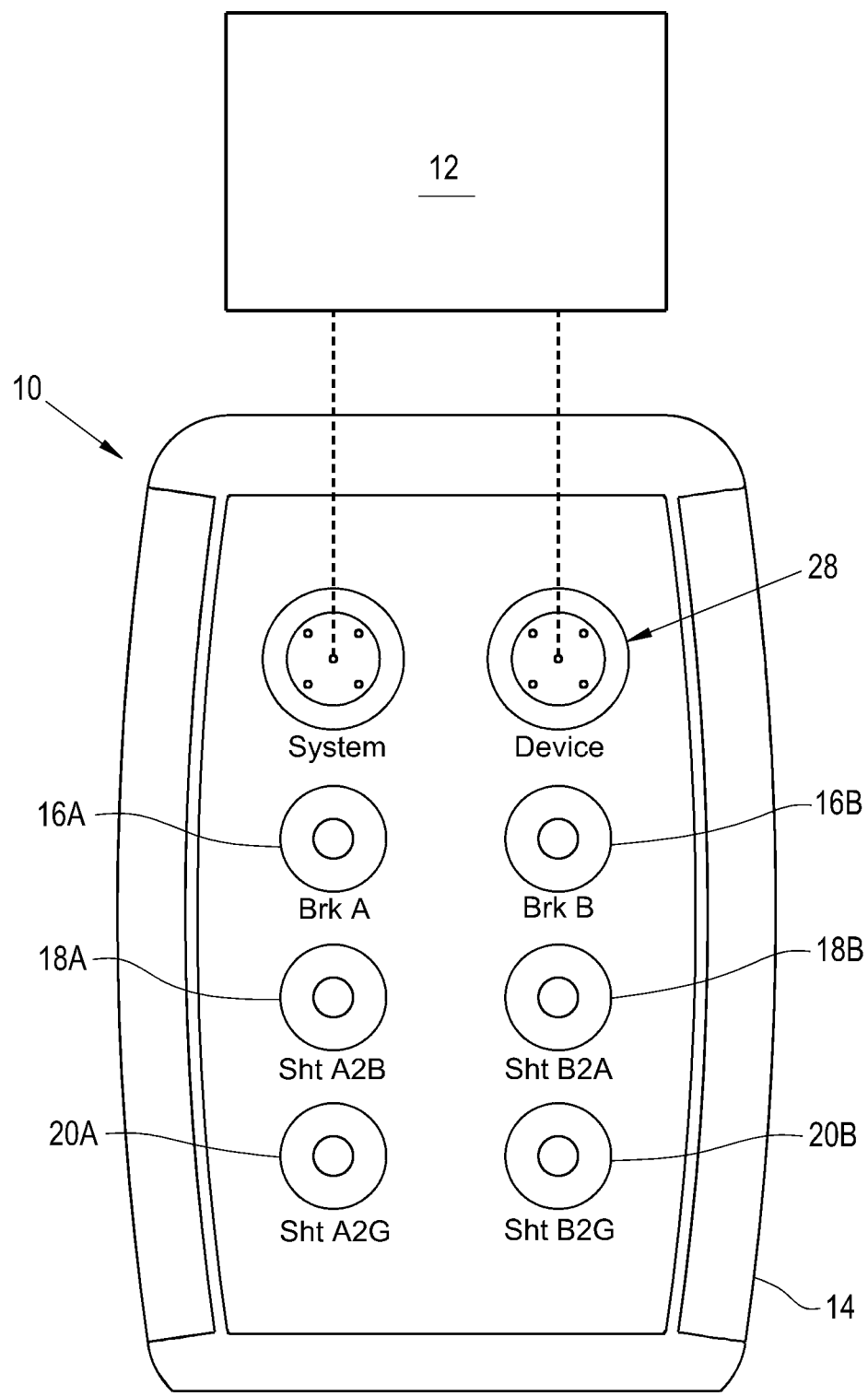
FIG. 3 is a schematic view of the safety validation device connected to a machinery safety system.
Figure 4:
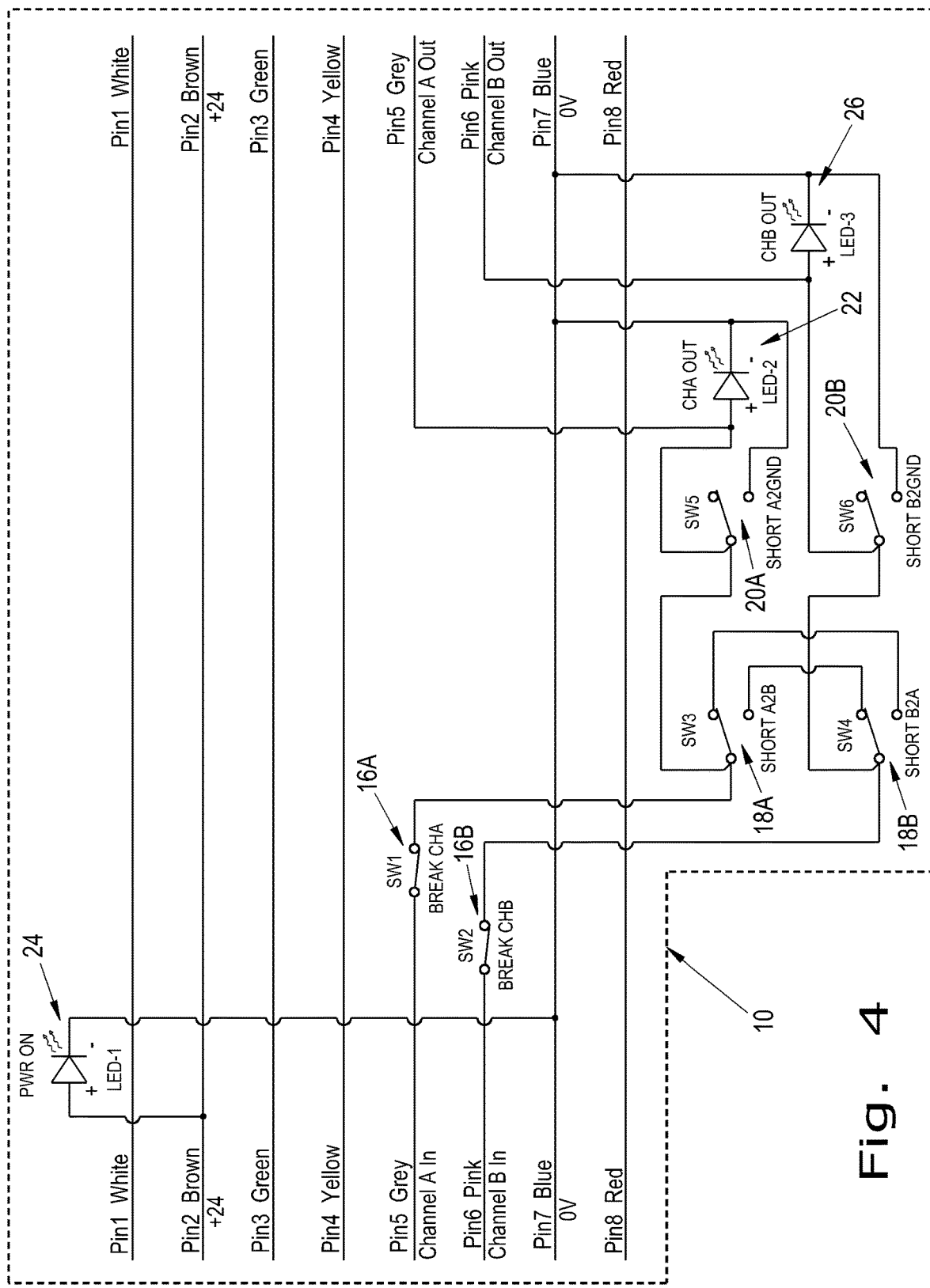
FIG. 4 is another schematic view of the safety validation device illustrating the switching positions thereof.

The at least one switch 16A, 16B, 18A, 18B, 20A, 20B can be connected to the housing 14. The at least one switch 16A, 16B, 18A, 18B, 20A, 20B can be operably connected to the at quick-connect interface 28 and/or the at least one indicator 22, 24, 26 by way of the circuit board 34 or electrical wiring disposed within the housing 14. The at least one switch 16A, 16B, 18A, 18B, 20A, 20B can include a first pair of switches in the form of break-channel switches 16A, 16B, a second pair of switches in the form of short-channel switches 18A, 18B, and/or a third pair of switches in the form of short-to-ground switches 20A, 20B. The break-channel switches 16A, 16B may induce at least two channel-break faults. For instance, switch 16A may induce a fault in channel A, and switch 16B may induce a fault in channel B (FIG. 3). The short-channel switches 18A, 18B may induce at least two cross-short faults in channel A and/or channel B. The short-to-ground switches 20A, 20B may induce at least two short-channel-to-ground faults. Hence, the switches 16A, 16B, 18A, 18B, 20A, 20B of the safety validation device 10 can provide three types of faults: a single channel break A and/or B, a cross short between channels A, B, and a short channel to ground. It should be appreciated that the safety validation device 10 can include only one switch or more than six switches for manipulating and inducing faults into the machinery safety system 12. It should be appreciated that the at least one switch 16A, 16B, 18A, 18B, 20A, 20B can be in the form of any desired member, such as a depressible button, a lever, a dial, a sliding switch, a toggle, etc.

The at least one indicator 22, 24, 26 can be connected to the housing 14. The at least one indicator 22, 24, 26 can be operably connected to the at least one switch 16A, 16B, 18A, 18B, 20A, 20B and/or the quick-connect interface 28 by way of the circuit board 34 or electrical wiring disposed within the housing 14. The at least one indicator 22, 24, 26 can be in the form of an indicator light 22, 24, 26. For example, the safety validation device 10 may include three indicator lights 22, 24, 26 positioned on the side of the housing 14. The indicator light 24 may signal that there is power in a particular channel. The indicator light 22 may be associated with channel A, and the indicator light 26 may be associated with channel B. Each indicator light 22, 24, 26 can be in the form of any desired light, such as an LED indicator light.

The quick-connect interface 28 can be connected to the housing 14 and operably connected to the at least one switch 16A, 16B, 18A, 18B, 20A, 20B and/or the at least one indicator 22, 24, 26. The quick-connect interface 28 may connect in series to the electrical panel of the machinery safety system 12. The quick-connect interface 28 may include a first, male connector 30 and a second, female connector 32 which each may connect to the machinery safety system 12. Since the connectors 30, 32 may directly interface with an electrical panel of the machinery safety system 12, the quick-connect interface 28 may connect to the machinery safety system 12 without disassembly of the machinery safety system 12. Each connector 30, 32 may be in the form of any desired connector, for example an M8 (PICO), M12 (MICRO), ⅞" (MINI), M19, M21, M23 connector, and/or spring clamp. As shown, each connector 30, 32 is an M12 pigtail connector.

The electrical processing circuit 34 may be disposed within the housing 14 and operably connected to each switch 16A, 16B, 18A, 18B, 20A, 20B, each indicator 22, 24, 26, and each connector 30, 32. The electrical processing circuit 34 may be in the form of a control circuit board 34 (FIG. 2). However, the electrical processing circuit 34 may be in the form of any desired digital or analog circuit.

Figure 5:
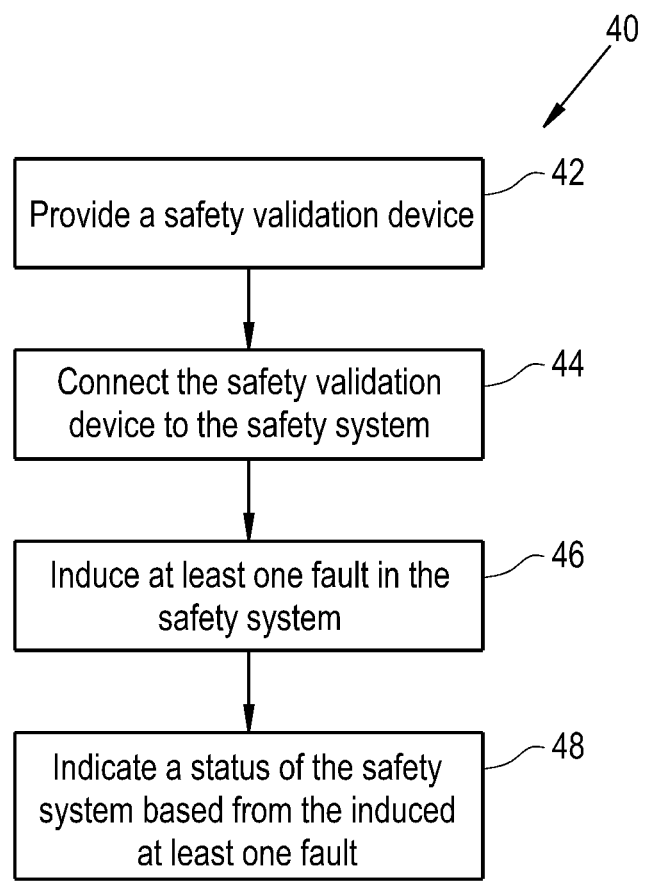
FIG. 5 is a flowchart of a method for validating the machinery safety system using the safety validation device of the present invention.

Referring now to FIG. 5, there is shown a flowchart of a method 40 for validating the machinery safety system 12 using the safety validation device 10 of the present invention. The method 40 may include an initial step of providing the safety validation device 10, as discussed above (at block 42). The method 40 may then include a step of operably coupling the quick-connect interface 28 of the safety validation device 10 with the electrical panel of the machinery safety system 10, or other portion thereof (at block 44). Next, the safety validation device 10 may be provided with power by the machinery safety system 12 and may subsequently induce at least one fault in the machinery safety system 12 (at block 46). For instance, the safety validation device 10 can induce three types of faults: at least one single channel break by actuating switch(es) 16A, 16B, at least one cross short between channels by actuating switch(es) 18A, 18B, and at least one short channel to ground by actuating switch(es) 20A, 20B. Next, the method 40 may include a step of indicating via the indicators 22, 24, 26 a status of the machinery safety system 12 (at block 48). For example, the user may induce a single channel break in channel A and/or channel B upon actuating the switch 16A and/or switch 16B for switching the respective channel A, B in the open position, which thereby simulates a wire break and accordingly toggles the respective indicator 22 and/or indicator 26. Additionally, for example, the user may also induce a cross short (A2B/B2A) upon actuating switch 18A and/or switch 18B for switching a short, which thereby simulates a cross short between channels A, B. In the case of a cross short, the indicator 22, 26 associated with the respective channel A, B should not change, since both signals are now fed from one source. Also, for example, the user may induce a ground short (A2GND/B2GND) upon actuating the switch 20A and/or switch 20B for switching a respective channel to a GND short position, which thereby simulates a ground fault and toggles the respective indicator 22, 26. In each fault case, the machinery safety system 12 should also detect the fault(s) and respond accordingly. It should be appreciated that varying safety device configurations have different signals (2 Hi; 1 Low, 1 Hi; etc.) which in turn would dictate the status of the indicator(s) 22, 24, 26. As can be appreciated, the safety level and design may have different requirements, and the resulting response of the machinery safety system 12 may need to be interpreted correctly to determine if the machinery safety system 12 is functioning properly. Lastly, the method 40 may include a final step of disconnecting the safety validation device 10 from the machinery safety system 12; thus, concluding the safety test of the machinery safety system 12.

Thereby, the safety validation device 10 may easily and efficiently connect to and test the machinery safety system 12 in a less dangerous manner. The safety validation device 10 eliminates the potential to cross wires during reassembly of the electrical panel. Additionally, the safety validation device 10 may remain connected to and in place during the entire diagnostic and fault detection test. Furthermore, the overall safety to the user may be is increased as the connections between the safety validation device 10 and the machinery safety system 12 are generally found outside of an electrical box of the machinery safety system 12.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for testing and validating a machinery safety system, comprising:
   providing a validation device including a housing, an electrical processing circuit disposed within the housing, at least one switch connected to the housing and operably connected to the electrical processing circuit, at least one indicator connected to the housing and operably connected to the electrical processing circuit, and a quick-connect interface connected to the housing and operably connected to the electrical processing circuit, the quick-connect interface is configured for connecting in series to the machinery safety system;
   connecting the validation device by the quick-connect interface to the machinery safety system;
   inducing at least one fault, by manipulating the at least one switch, in the machinery safety system; and
   indicating by the at least one indicator a status of the machinery safety system;
   wherein the at least one switch includes a first pair of switches in the form of break-channel switches which each induce a channel-break fault;
   wherein the at least one switch includes a second pair of switches in the form of short-channel switches which each induce a cross-short fault;
   wherein the at least one switch includes a third pair of switches in the form of short-to-ground switches which each induce a short-channel-to-ground fault;
   wherein the step of inducing at least one fault includes inducing at least one single channel-break fault by actuating at least one break-channel switch, inducing at least one cross-short fault by actuating at least one short-channel switch, and inducing at least one short-channel-to-ground fault by actuating at least one short-to-ground switch.

2. The method of claim 1, wherein the electrical processing circuit is configured for validating at least one of a hardware, a software design, an assembly, and wiring of the machinery safety system.

3. The method of claim 2, wherein the electrical processing circuit is configured for validating the machinery safety system as required by an ISO 13849-2 safety standard.

4. The method of claim 1, wherein the at least one indicator is in the form of an indicator light.

5. The method of claim 1, wherein the at least one indicator includes three indicator lights.

6. The method of claim 1, wherein the quick-connect interface includes a first connector and a second connector which both are configured for connecting to the machinery safety system.

* * * * *